INVENTOR.
SPENCER D. HOWE,
BY
AGENT.

United States Patent Office 3,002,402
Patented Oct. 3, 1961

3,002,402
DIFFERENTIAL TORQUE APPLYING DEVICE
Spencer D. Howe, Los Angeles, Calif., assignor to Hughes Aircraft Company, Culver City, Calif., a corporation of Delaware
Filed Oct. 1, 1958, Ser. No. 765,705
3 Claims. (Cl. 74—766)

This invention relates generally to a differential torque applying device and relates primarily to an apparatus for applying torque in response to a signal input. The device is intended primarily for use in connection with gyroscope mechanisms to which precessional torque must be transmitted for control or establishment of stable platforms and the like.

Heretofore it has been the practice to utilize simple motors, clutches, gear trains and the like, to provide desired torque. In instances such as in connection with gyroscopic control systems, it is important that extreme reliability be gained through use of a light weight unit that is as simplified as possible and wherein worm gears and other inherent power dissipation structures are eliminated. In the design and construction of such devices, certain requirements are presented such as the production of a torque output that is proportional to an electrical input signal or a plurality of signals. Additionally, the torque output must be completely independent of position or rotation rate of a torque output shaft and must be as nearly independent as possible of rotational acceleration of the output shaft. Furthermore, the torque output must be independent of rotational acceleration of the body of the device about the output shaft, with the shaft stationary in space. In addition, while the before mentioned requirements must be met, it is further desirable that the device be compact, light weight, possess an ease of manufacture and be economical and efficient relative to input power requirements.

Prior known torque producing devices have utilized either A.C. servo motors, D.C. rotary electromagnets or slipping type clutches. Slip clutches may be divided into several types, namely, friction, eddy-current or hysteresis mechanisms. The motor or clutch utilized in such mechanisms must be such as to handle the full output torque required and the use of conventional gear head types of mechanisms to obtain high torque from a small motor will render the resultant mechanism incapable of producing torque that is independent of rotational acceleration of the body of the device about the output shaft.

A.C. types of servo motors are unduly heavy and require a considerable input power for the operation thereof. Furthermore, A.C. servo motors have but a single input and thus all the input power must be conducted through the control circuitry and the torque output is limited by the components in this circuitry. Additionally, with mechanisms of this type the torque output is not entirely independent of rotational acceleration of the output shaft due to the fact that the moving elements of the servo motor have unduly high inertia.

In other instances, rotary electromagnets may be constructed with a plurality of inputs, one of which may be made small and pass through controlling circuitry, while the other may be made large and maintained constant. However, in devices of this type the structures employed are extremely heavy, have high inertia and are limited in their usable arc of action.

Attempts have also been made to utilize all types of slipping clutches, inasmuch as these mechanisms are the lightest and most easily controlled clutch devices. The controlling power that is utilized to energize this type of clutch mechanism may be very small and the large input power which drives the motor back of the clutch need not be held particularly constant since the motor need only operate and the speed thereof is relatively unimportant. However, friction type clutches are not always stable in that the amount of torque per unit of control power is a function of the condition of the friction surfaces and this condition of the surfaces is in turn a function of shelf life, wear, cleanliness, humidity, temperature, etc.

Attempts have been made to utilize the eddy-current types of clutches for this particular purpose; however, these mechanisms produce a torque output that is not completely independent of position or rate of the output shaft since the torque from an eddy-current clutch is proportional to the relative speed between two members.

Of all of the possible structures that may be employed for the present purpose, only the hysteresis clutch remains. This type of structure has some disadvantages as commonly know. However, these disadvantages have been utilized in the device of this invention in such a manner as to reduce the importance or effects thereof. Specifically, this type of clutch has two moving members, a hysteresis ring and an electromagnet. However, the hysteresis ring has a much lower inertia of the two elements and is, therefore, used as an output member in order to provide a mechanism that is as nearly independent as possible from the rotational acceleration of the output shaft. The input member is continuously rotated by a driving motor and, accordingly, if the electromagnet is utilized as the input member, it must be fed through slip rings which are a source of frictional loss, electrical noise and unreliability.

It is accordingly one object of this invention to provide a differential torquing mechanism incorporating a pair of hysteresis clutch structures and having no moving electrical contacts.

It is another object of the invention to provide a torque applying device wherein torque output is as close as possible to being independent of rotational acceleration of the body of the device about the input shaft.

It is a further object of the invention to provide a differential torque applying device wherein the torque output is completely independent of position or rotation rate of the torque output shaft.

It is a still further object of the invention to provide a differential torque applying device that is compact, light weight, relatively easy to manufacture, relatively economical and efficient relative to input power requirements.

Another object of the invention is to provide a differential torque applying device having detail construction mechanism that is reliable in operation and of a nature to enable use thereof in aerial vehicles.

Other and further important objects of the invention will become apparent from the disclosures of the following detailed specification, appended claims and accompanying drawings, wherein:

Figure 1:
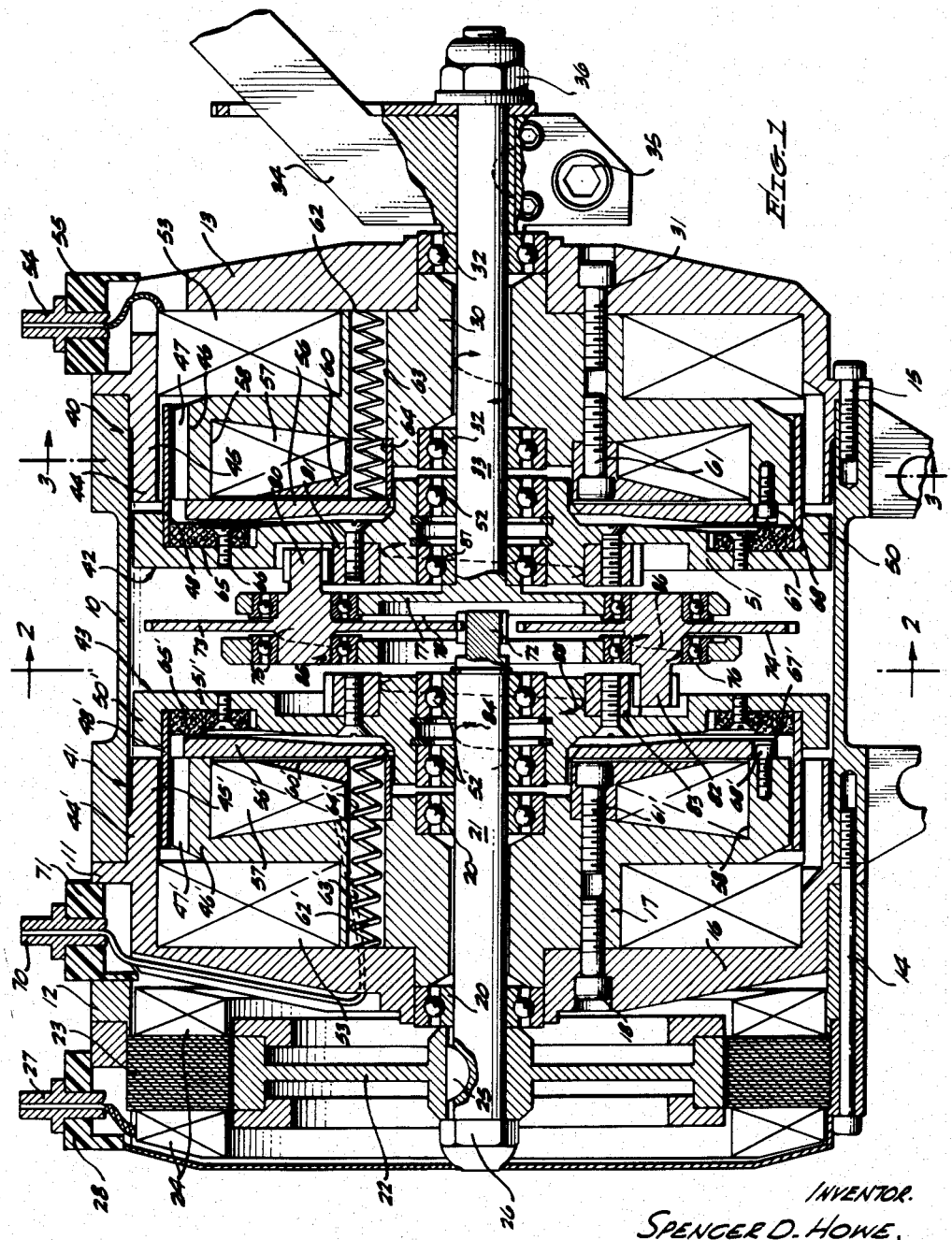
FIGURE 1 is a longitudinal sectional view through the differential torque applying device of the present invention.

With reference to the drawings, the torque applying device hereof includes a central housing section 10, an outer magnetic section 11, a motor housing section 12 and an outer magnetic section 13. Sections 11 and 13 are identical in form and function, but are enumerated separately for descriptive purposes. The motor housing section 12 and the magnetic section 11 are secured to the central housing section 10 by means of a plurality of bolts 14 which threadably engage the housing section 10. Likewise, the magnetic section 13 is secured to the central housing section 10 by means of a plurality of bolts 15 which threadably engage the central housing section 10. All of the various housing sections 10–13 are generally annular and serve to enclose the mechanism of this device. In actual practice, the device is approximately 3" in diameter and 4" in overall length, suitable flanges being provided on the various housing sections to enable proper interengagement and close fitting, whereby to dispose the various components of the device in a relatively air tight housing.

As shown primarily in FIG. 1, the outer magnetic section 11 has a transversely disposed web portion 16 that is secured to the inner magnetic member 17 by means of a plurality of bolts 18 which threadably engage the magnetic member 17. The magnetic member 17 further serves to position a pair of bearings 20 in which an input shaft 21 is rotatably journaled. One end of the input shaft 21 is secured to a rotor 22 of an input driving motor which further includes a laminated core 23 and coils 24 that are positioned within the input housing 12. The shaft 21 is keyed to the rotor 22 as at 25 and secured thereon by means of a nut 26. Suitable terminals 27 are carried by a fitting 28 and are used for connecting a suitable supply of electrical current to the coils 24.

The outer magnetic member 13 is suitably connected to an inner magnetic member 30 by means of a plurality of bolts 31 which threadably engage the member 30. The magnetic member 30 is identical in form to member 17, and is adapted to position a pair of bearings 32 in which an output shaft 33 is rotatably journaled. The shaft 32 extends outwardly from one end of the housing member 13 and is provided with a torque arm 34 that is keyed thereto and clamped in position by means of a suitable bolt 35. The output arm 34 is further retained in position on the outer end of the shaft 33 by means of a suitable nut 36.

As shown in FIG. 1, identical hysteresis clutches and brake mechanisms, indicated generally at 40 and 41 are disposed about each of the shafts 21 and 33. As viewed in FIG. 1, the right hand hysteresis clutch and brake unit 40 includes a rotatable assembly indicated generally at 42, while the left hand hysteresis clutch and brake unit 41 includes a rotating assembly indicated generally at 43. The assemblies 42 and 43 are substantially identical and have been separately enumerated for descriptive purposes. Inasmuch as both of the hysteresis clutch and brake assemblies 40 and 41 and the rotating elements 42 and 43 are substantially identical, only the right hand unit 40 will be described herein, the elements in the left hand unit 41, that are identical to the elements in the right hand unit 40, being indicated by single primed referenced numerals, corresponding elements of the left hand unit 41 being the same.

Figure 3:
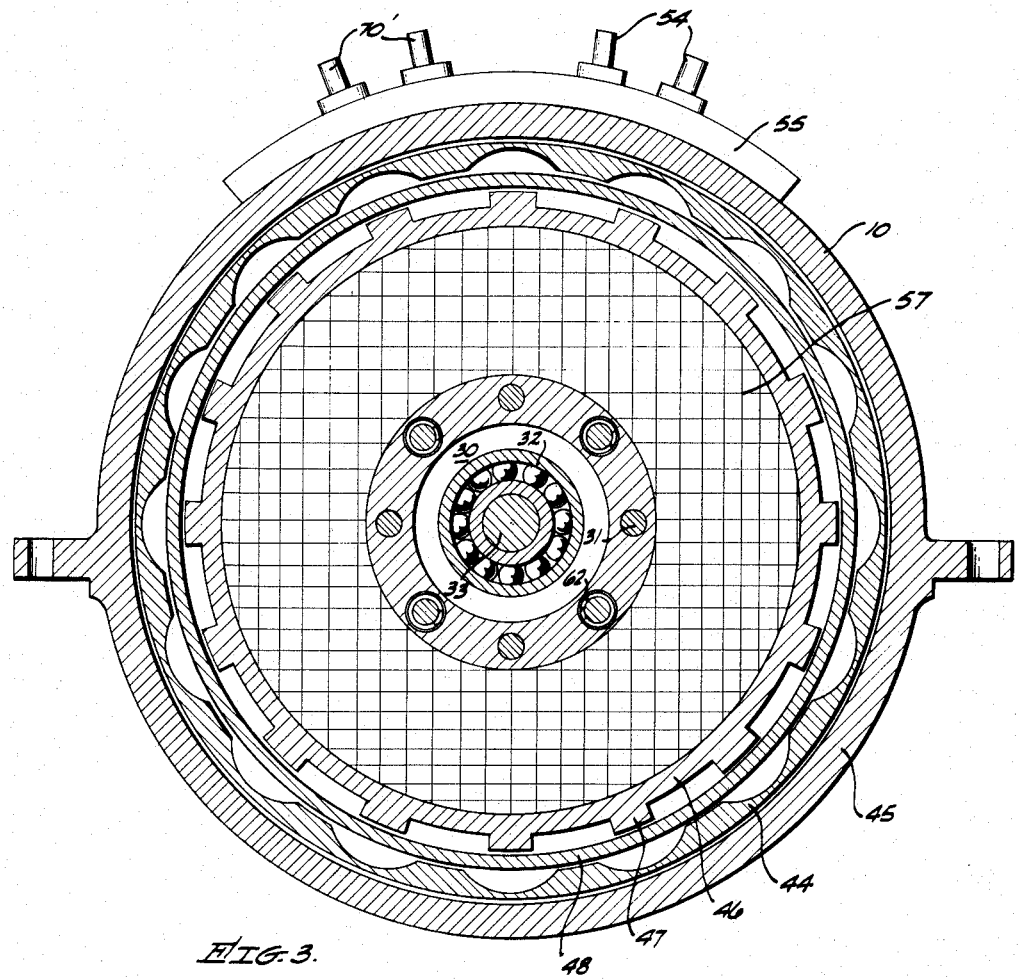
FIG. 3 is a transverse sectional view through one of the hysteresis clutches, as taken substantially as indicated by line 3—3, FIG. 1.

The hysteresis clutch and brake unit 40 includes an outer ring 44 that is provided with a plurality of poles 45, FIG. 3, and an inner ring 46 having poles 47. The ring 44 is formed on an annular extension of the outer magnetic member 13 and the ring 46 is formed on the outer periphery of the inner magnetic member 30. The poles 45 and 47 of the rings 44 and 46 respectively are positioned in radially spaced relationship, there being an annular hysteresis ring 48 positioned therebetween. The hysteresis ring may be made in accordance with the teachings of copending application, Serial Number 744,890, filed June 23, 1958. The hysteresis ring 48 is connected to a peripheral flange 50 that is in turn formed on a hub member 51 forming a portion of the rotating assembly 42. The hub member 51 is rotatably journaled on bearings 52 that are mounted on an inner end of the output shaft 33. A coil 53 is wound about one end of the inner magnetic member 30 and within a portion of the outer ring 44. A plurality of terminals 54 are carried by a fitting 55 that is in turn mounted on the outer magnetic member 13, the terminals 54 being utilized to connect a suitable source of electrical energy to the coil 53.

The hysteresis clutches 40 and 41 are of the general type disclosed in Patent Number 2,908,832, issued October 13, 1959. The construction of the clutches 40 and 41 is such as to permit free rotation of the hysteresis ring 48 and rotating unit 42 when no electrical energy is supplied to the coil 53 and, upon application of electrical energy to the coil 53, hysteresis action serves magnetically to couple the hysteresis ring 48 to the rings 44 and 46.

The hysteresis brake and clutch assemblies 40 and 41 are further each provided with a braking ring 56 that is disposed between one face of the coil supporting member 30 and the rotating member 42. A braking coil 57 is disposed in a recess 58 in the coil supporting member 30, there being a core 60 disposed in association with the coil 57 and secured to the member 30 by means of a plurality of bolts 61. One face of the braking ring 56 is disposed in slight spaced relationship to an axial face of the core 60 and the ring 56 is biased away from the core 60 by means of a plurality of circumferentially spaced compression springs 62 that are disposed in openings 63 and 64 in the member 30 and core 60 respectively. The compression springs 62 are disposed between an inner face of the outer magnetic member 13 and an inner face of the braking ring 56. As shown, one axial surface of the hub 51 carries a brake lining 65 that is secured thereto by means of screws 66. Additionally, the braking ring 56 has a plurality of peripheral notches 67 that are disposed about the heads of a plurality of bolts 68 which threadably engage the inner magnetic member 30, whereby to prevent rotation of the braking ring 56. As shown in association with the mechanism 41, a plurality of terminals 70 are carried by a fitting 71 which is in turn connected to the outer magnetic member 11. Suitable electrical energy is provided for the braking coil 57 through the terminal 70.

It may thus be seen that when the coil 57 is de-energized, the braking ring 56 will be biased into contact with the brake lining 65 by action of the compression springs 62. Upon energization of the coil 57, the braking ring will be moved against the compression of the springs 62 and away from the lining 65, whereby to permit free movement of the rotating element 42. Accordingly, depending upon the amount of energy supplied to the hysteresis coil 53, the rotating assembly 42 may have a variable braking applied thereto through the hysteresis clutch arrangement and, upon de-energization of the braking coil 57, the rotating unit 42 may be retained completely relative to fixed portions of the mechanism.

Figure 2:
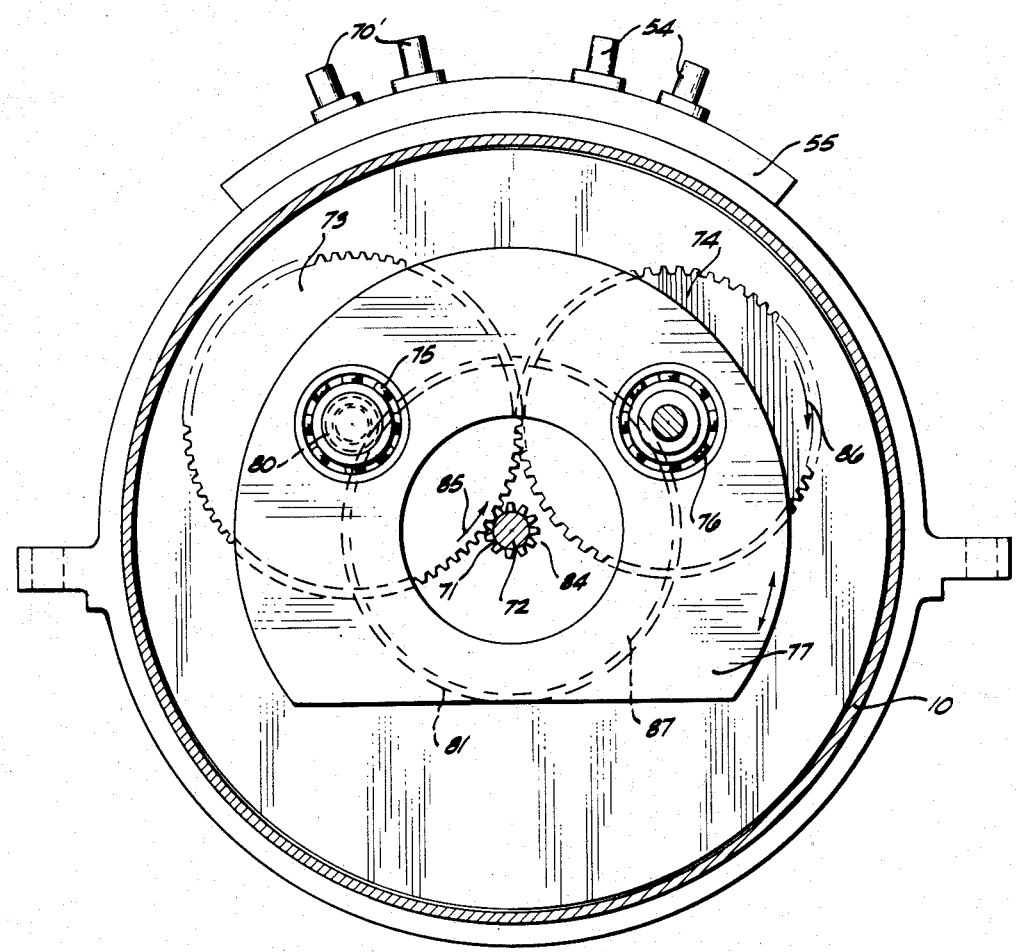
FIG. 2 is a transverse sectional view through the planetary gear system, as taken substantially as indicated by line 2—2, FIG. 1.

As shown in FIGS. 1 and 2, the rotating assembly 43 is journaled on bearings 52' that are in turn mounted on an inner end of the input shaft 21. The shaft 21 further carries a motor pinion gear 72 that is adapted for driving cooperation with a planetary gear 73 which in turn mates with another planetary gear 74, FIG. 2. Inasmuch as the planetary gears 73 and 74 have axes arranged on one side of the axis of the shafts 21 and 33, illustration thereof has been made, for clarity, in a rotated manner in FIG. 1, with the specific relationship of these gears being shown in FIG. 2. The gears 73 and 74 are each journaled in bearings 75 and 76 respectively that are carried by a spider 77 having a suitable slot 78 therein for reception of the gears 73 and 74. The spider 77 is formed on an inner end of the output shaft 33. The planetary gear 73 is provided with an integral planetary pinion gear 80 that is adapted for cooperation with a sun gear 81 that is in turn connected to the rotating unit 42. Additionally, the planetary gear 74 is provided with an integral planetary pinion gear 82 which is adapted for cooperation with a sun gear 83 that is in turn carried by the rotating unit 43.

It may thus be seen that, with the shaft 21 being driven in the direction of the arrow 84, the planetary gear 73 will be driven in the direction of the arrow 85 and the planetary gear 74 will be driven in the direction of the arrow 86. Additionally, when no energy is provided to the hysteresis coils 53 and 53', the rotating units 42 and 43 will be driven in the directions of the arrows 87 and 88 respectively. In this instance, there will be no torque applied to the spider 77 or the output shaft 33. Upon energization of the coil 53, the rotating unit 42 will be restricted in its rotation due to action of the hysteresis clutch 40 and a torque will be applied to the output shaft 33 and output member 34 in a direction opposite to the direction of rotation as the input shaft 21. However, when the hysteresis coil 53' is energized, a resistance to rotation will be applied to the rotating unit 43, whereby to provide an output torque on the shaft 33 and output member 34 that is in the same direction of rotation of the input shaft 21. It may thus be seen that an integral of input signals serving to energize the coils 53 and 53' will provide a resultant torque upon the output shaft 33 in a direction determined by the relative strengths of the input signals. Additionally, through selective energization of the braking coils 57 or 57', the rotating units 42 or 43, together with the sun gears 81 or 83 may be stopped, whereby to provide maximum torque output through the shaft 33 in one direction or the other. Additionally, should all electrical power to the device be shut off, output shaft 33 is locked, thus eliminating the need for a separate caging mechanism when the device is used to precess a gyro.

It may thus be seen that the device hereof produces a torque output that is proportional to an electrical input signal and that the torque output is completely independent of position or rotation rate of the output shaft and is as independent as possible of rotational acceleration of the output shaft. Further, the torque output of the device is independent of rotational acceleration of the body of the device about the output shaft, the output shaft being stationary in space.

Having thus described the invention and the present embodiment thereof, it is desired to emphasize the fact that many modifications may be resorted to, including single hysteresis clutch units or different mounting arrangements for the shafts, without departing from the spirit and scope of the invention and in a manner limited only by a just interpretation of the following claims.

I claim:

1. A differential torque applying apparatus comprising: a housing; a power input shaft and a torque output shaft rotatably journaled in said housing; means for continuously driving said input shaft; a planetary gear system carried by and interconnecting adjacent ends of said input and output shafts, said planetary system including a pair of sun gears attached to and disposed concentrically with said shafts; a hysteresis clutch mechanism having a movable member carried by each of said sun gears, said clutch mechanisms being adapted for differential energization whereby to provide transmission of bidirectional torque to said output shaft; and a separate magnetically operable brake mechanism carried by each of said hysteresis clutch mechanisms and individually engageable with said sun gears.

2. A differential torque applying apparatus comprising, in combination: a housing; a power input shaft and a torque output shaft rotatably journaled in said housing; means for continuously driving said input shaft; a planetary gear system carried by and interconnecting adjacent ends of said input and output shafts, said planetary system including a pinion gear carried by said input shaft, a pair of interengaging planetary gears, a pair of planetary pinion gears and a pair of sun gears attached to and disposed concentrically with said shafts; a hysteresis clutch mechanism having a movable member carried by each of said sun gears, said clutch mechanisms being adapted for differential energization whereby to provide transmission of bidirectional torque to said output shaft, portions of said housing serving to complete a magnetic field about each of said clutch mechanisms; and a separate magnetically operable brake mechanism carried by and associated for operation with each of said hysteresis clutch mechanisms, said brake mechanisms being individually engageable with said sun gears and normally biased into braking contact with rotating elements of each of said clutch mechanisms.

3. A differential torque applying apparatus comprising, in combination: a housing; a power input shaft and a torque output shaft rotatably journaled in opposite ends of said housing; electric motor means positioned within said housing, connected with and for continuously driving said input shaft; torque output crank means carried by an outer end of said output shaft; a planetary gear system carried by and interconnecting adjacent ends of said input and output shafts, said planetary system including a pinion gear carried by said input shaft, a pair of interengaging planetary gears, a pair of planetary pinion gears and a pair of sun gears, said sun gears being disposed concentrically with said shafts; hysteresis clutch mechanisms carried by said housing and each having a rotatable element connected with each of said sun gears, said clutch mechanisms being adapted for differential energization whereby to induce rotary drag upon sun gears and provide transmission of bidirectional torque to said output shaft, portions of said housing serving to complete a magnetic field about each of said clutch mechanisms; and a separate magnetically operable brake mechanism carried by portions of each of said hysteresis clutch mechanisms and said housing, said brake mechanisms being engageable with sun gear connected portions of said hysteresis clutch mechanisms and normally biased into braking contact with said rotatable elements of each of said clutch mechanisms.

References Cited in the file of this patent

UNITED STATES PATENTS

| | | |
|---|---|---|
| 2,258,005 | Durdin | Oct. 7, 1941 |
| 2,441,157 | Kissel | May 11, 1948 |
| 2,679,604 | Jaeschke | May 25, 1954 |
| 2,682,789 | Ochtman | July 6, 1954 |
| 2,775,144 | Kelbel | Dec. 25, 1956 |
| 2,807,734 | Lehde | Sept. 24, 1957 |
| 2,826,937 | Ochtman | Mar. 18, 1958 |
| 2,910,892 | Hodge | Nov. 3, 1959 |